United States Patent
Dantressangle et al.

(10) Patent No.: US 11,120,366 B2
(45) Date of Patent: Sep. 14, 2021

(54) DATA FORECASTING BASED ON MACHINE LEARNING ANALYSIS OF DATA ACCESS STATISTICS

(71) Applicant: International Business Machines Corporation, Armonk, NY (US)

(72) Inventors: Patrick Dantressangle, Eastleigh (GB); Simon Laws, Liss (GB); David George Radley, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 647 days.

(21) Appl. No.: 16/043,241

(22) Filed: Jul. 24, 2018

(65) Prior Publication Data

US 2020/0034330 A1 Jan. 30, 2020

(51) Int. Cl.
*G06N 20/00* (2019.01)
*G06F 17/18* (2006.01)
*G06T 11/20* (2006.01)
*H04L 29/08* (2006.01)

(52) U.S. Cl.
CPC ............ *G06N 20/00* (2019.01); *G06F 17/18* (2013.01); *G06T 11/206* (2013.01); *H04L 67/22* (2013.01)

(58) Field of Classification Search
CPC ....... G06N 20/00; G06F 17/18; G06T 11/206; H04L 67/22

USPC ............................................................ 706/12
See application file for complete search history.

(56) References Cited

U.S. PATENT DOCUMENTS

| | | | |
|---|---|---|---|
| 9,959,324 B2 | 5/2018 | Dantressangle et al. | |
| 10,122,605 B2* | 11/2018 | Kulkarni | G06F 11/3006 |
| 10,805,235 B2* | 10/2020 | Kulkarni | H04L 47/2475 |
| 2012/0117070 A1 | 5/2012 | Hiltz-Laforge et al. | |
| 2016/0092474 A1 | 3/2016 | Stojanovic et al. | |
| 2016/0239399 A1 | 8/2016 | Shivnath et al. | |
| 2017/0006135 A1* | 1/2017 | Siebel | H04L 69/40 |
| 2018/0025061 A1 | 1/2018 | Dantressangle et al. | |
| 2018/0262864 A1* | 9/2018 | Reynolds | G06F 21/6245 |

FOREIGN PATENT DOCUMENTS

WO 2017097103 A1 6/2017

* cited by examiner

*Primary Examiner* — William D Titcomb
(74) *Attorney, Agent, or Firm* — Peter K. Suchecki

(57) ABSTRACT

Methods and systems may provide for technology to conduct a machine learning analysis of data access statistics with respect to a plurality of separate datasets and determine a time-dependent access pattern based on the machine learning analysis, wherein the time-dependent access pattern includes an expert access trend, a curation access trend and a knowledgebase access trend. The technology may also generate one or more data management recommendations with response to the plurality of separate datasets based on the time-dependent access pattern.

20 Claims, 3 Drawing Sheets

DATA FORECASTING BASED ON MACHINE LEARNING ANALYSIS OF DATA ACCESS STATISTICS

BACKGROUND

Embodiments generally relate to data forecasting. More particularly, embodiments relate to data forecasting based on machine learning analysis of data access statistics.

Preparing and understanding enterprise data from large and heterogeneous datasets may not be straightforward. Accordingly, inefficiencies may result in terms of the storage, retrieval, processing and/or delivery of data.

BRIEF SUMMARY

Embodiments may include a performance-enhanced computing device comprising network interface circuitry to receive data access statistics, a processor coupled to the network interface circuitry, and a computer readable storage medium coupled to the processor, the computer readable storage medium having program instructions embodied therewith, the program instructions executable by the processor to cause the computing device to conduct a machine learning analysis of the data access statistics with respect to a plurality of separate datasets, generate a plurality of heat maps based on the machine learning analysis, wherein the plurality of heat maps represents a time-dependent access pattern and includes an expert access trend, a curation access trend and a knowledgebase access trend, wherein the expert access trend specifies one or more users who are inferred to be experts in at least a portion of the plurality of separate datasets, wherein the curation trend specifies one or more users who are inferred to be curators of at least a portion of the plurality of separate datasets, and wherein the knowledgebase access trend specifies one or more users who are inferred to be learners of at least a portion of the plurality of separate datasets, identify map regions in the plurality of heat maps that have an activity level above a threshold, and generate one or more data management recommendations with respect to the plurality of separate datasets based on the time-dependent access pattern, wherein the one or more data management recommendations correspond to the map regions projected to future moments in time.

Embodiments may also include a method comprising conducting a machine learning analysis of data access statistics with respect to a plurality of separate datasets, generating a plurality of heat maps based on the machine learning analysis, wherein the plurality of heat maps represents a time-dependent access pattern and includes an expert access trend, a curation access trend and a knowledgebase access trend, wherein the expert access trend specifies one or more users who are inferred to be experts in at least a portion of the plurality of separate datasets, wherein the curation trend specifies one or more users who are inferred to be curators of at least a portion of the plurality of separate datasets, and wherein the knowledgebase access trend specifies one or more users who are inferred to be learners of at least a portion of the plurality of separate datasets, identifying map regions in the plurality of heat maps that have an activity level above a threshold, generating one or more data management recommendations with respect to the plurality of separate datasets based on the time-dependent access pattern and a user prompt response, wherein the one or more data management recommendations correspond to the map regions projected to future moments in time, detecting a deviation from the time-dependent access pattern, and generating an alert in response to the deviation.

Embodiments may also include a computer program product to manage datasets, the computer program product comprising a computer readable storage medium having program instructions embodied therewith, the program instructions executable by a computing device to cause the computing device to conduct a machine learning analysis of data access statistics with respect to a plurality of separate datasets, determine a time-dependent access pattern based on the machine learning analysis, wherein the time-dependent access pattern includes an expert access trend, a curation trend and a knowledgebase access trend, and generate one or more data management recommendations with respect to the plurality of separate datasets based on the time-dependent access pattern.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
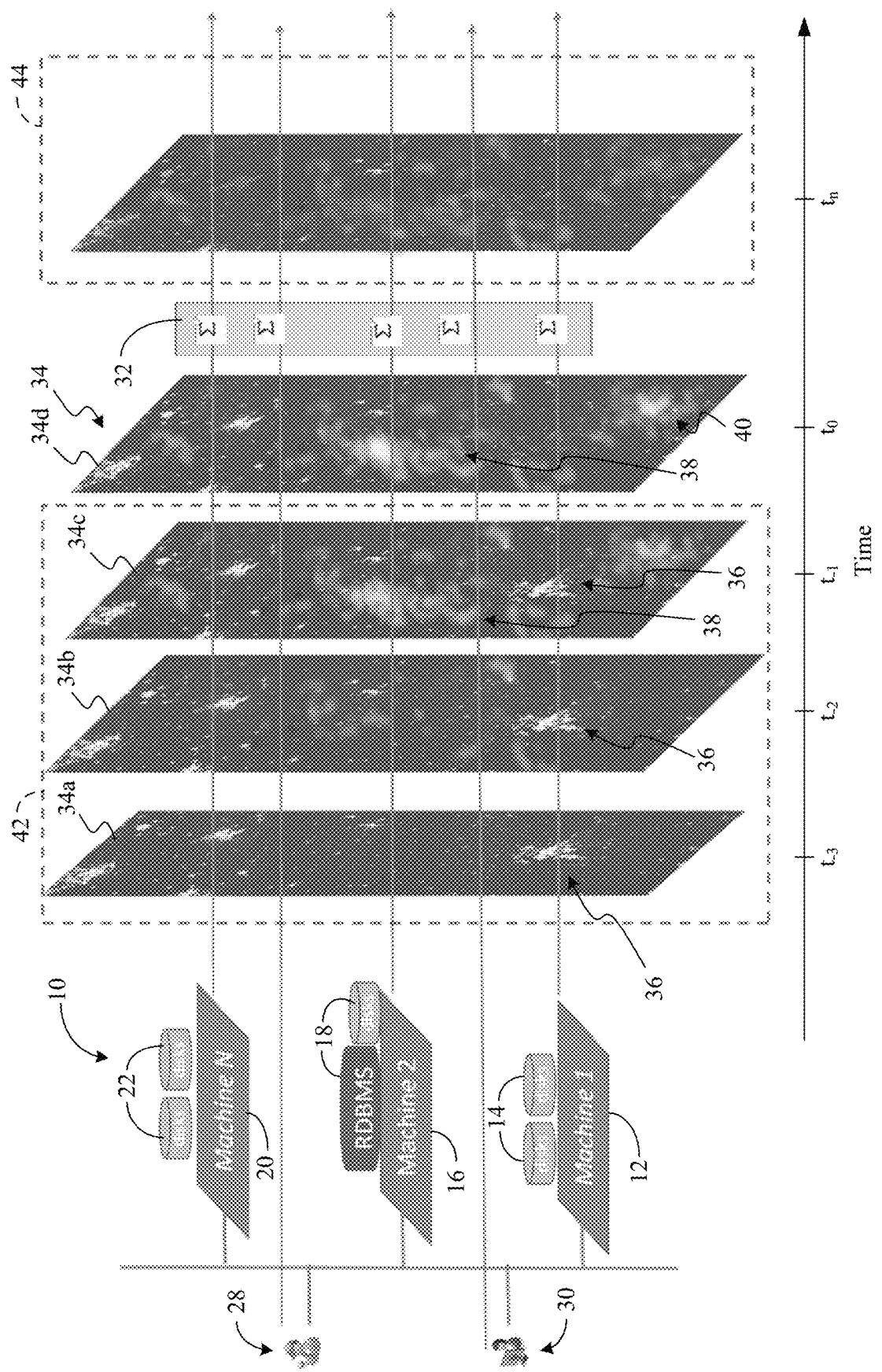
FIG. 1 is an illustration of an example of a plurality of heat maps according to an embodiment.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Turning now to FIG. 1, a computing architecture 10 (e.g., data landscape) is shown in which a first machine 12 ("Machine 1") accesses data stored on a first disk array 14, a second machine 16 ("Machine 2") accesses data stored on a second disk array 18, a third machine 20 ("Machine N") accesses data stored on a third disk array 22, and so forth. In an embodiment, the data stored in the disk arrays 14, 18, 22 is both large in quantity (e.g., Big Data) and heterogeneous (e.g., separate datasets with different data structures). In the illustrated example, the second disk array 18 includes a relational database management system (RDBMS). Users such as a data steward 28, a data analyst 30 and/or other users, access the datasets over time for various purposes. For example, the data steward 28 may curate/manage portions of the datasets, whereas the data analyst 30 might learn from portions of the datasets. Additionally, other users may be experts (e.g., eminent) in portions of the datasets. In an embodiment, the roles (e.g., curator, learner, expert, etc.) of the users are neither pre-defined (e.g., an assigned/allocated responsibility from the organization) nor fixed.

For example, the individual who is the data steward 28 may act as a curator over a portion of the datasets at one moment at time and learn from a portion of the datasets at another moment in time (or the same moment in time if the dataset portions are different). Similarly, the individual who is the data analyst 30 may learn from a portion of the datasets at one moment in time and be an expert in a portion of the datasets at another moment in time (or the same moment in time if the dataset portions are different). In an embodiment, a machine learning (ML) analysis 32 of data access statistics (e.g., user information, device information, location information, etc.) is conducted with respect to the separate datasets, wherein a time-dependent access pattern is determined based on the ML analysis.

More particularly, a plurality of heat maps 34 (34a-34d) is generated to reflect the time-dependent access pattern (e.g., access activity across all of the datasets). In an embodiment, the plurality of heat maps 34 result from a modeling process. Thus, a first heat map 34a is generated for time $t_{-3}$, a second heat map 34b is generated for time $t_{-2}$, a third heat map 34c is generated for time $t_{-1}$, and a fourth heat map 34d is generated for time $t_o$, in the illustrated example. In an embodiment, the heat maps 34 define expert access trends, curation access trends, knowledgebase access trends, and so forth, wherein the first heat map 34a, the second heat map 34b, and the third heat map 34c represent past states 42 of the access pattern and the fourth heat map 34d represents the current state of the access pattern. Each heat map 34 may include one or more map regions that have an activity level above a threshold, which is indicative of a data "storm." In an embodiment, the formation of a first storm 36 is automatically identified in the first heat map 34a, the formation of a second storm 38 is automatically identified in the third heat map 34c, the formation of a third storm 40 is automatically identified in the fourth heat map 34d, and so forth.

In one example, the heat maps 34 are generated via techniques similar to numerical weather prediction. For example, the ML analysis 32 may use metadata about the different assets and access patterns (e.g., lineage including data sizes, number of records, etc.). In an embodiment, the metadata is considered one or more labelled datasets with the variables/features. From there, a model is created that will take the parameters and predict the next set of records moving in time and space, data sizes, hotspots etc. In one example, the ML analysis 32 includes applying the data access statistics to neural network (e.g., long short-term memory/LSTM or other type of recurrent neural network/RNN) layers such as, for example, connection layers, access pattern layers, relationship layers, etc., or any combination thereof.

As will be discussed in greater detail, one or more data management recommendations (e.g., usage recommendations, contact recommendations, infrastructure recommendations) are generated with respect to the datasets based on the time-dependent access pattern defined by the heat maps 34. In an embodiment, the data recommendations correspond to the storms 36, 38, 40 (e.g., map regions having an activity level above the threshold) projected to a future state 44 (e.g., a future moment at time $t_n$). For example, if it is determined that the first storm 36 corresponds to a curator adding twenty million rows to a table and there is a repetitive nature to this activity (e.g., similar activity occurs near the end of each month), the data recommendation may be to make a usage recommendation such as informing other users to expect a slowdown in their data access near the end of the next month.

Similarly, if it is determined that the second storm 38 corresponds to an expert making several metadata updates to another dataset and the updates continue to grow in volume, the data recommendation might be an infrastructure recommendation such as freeing up processing resources on the machines where the metadata updates are being made or moving the data to another machine having more processing resources. In another embodiment, if it is determined that the third storm 40 corresponds to a large number of users viewing a training video just before a training deadline, the data recommendation might be to contact a user who has been automatically detected (e.g., via ML inference) as being eminent with regard to the content of the training video. In yet another example, a storm coming on the first machine 12 and the second machine 16 in the next ten minutes triggers an email to another database manager. Other data recommendations may be made based on other conditions (e.g., unrelated processes concurrently using the same resources). In an embodiment, the data management recommendations are generated further based on user prompt responses (e.g., affirmative response to the prompt: "You are a high user of this dataset, please confirm which parts you are an expert in, would like to know more about, are not interested in," etc.).

The illustrated ML analysis 32 therefore enhances performance by enabling time-dependent access patterns to be automatically determined and projected to future moments in time. Moreover, distinguishing between expert access trends, curation access trends, knowledgebase access trends, etc., enables the data management recommendations to be more closely tailored to the specific users involved (e.g., particularly when the organization/enterprise has not pre-selected the experts, curators and/or learners or the pre-selections are incorrect).

Figure 2:
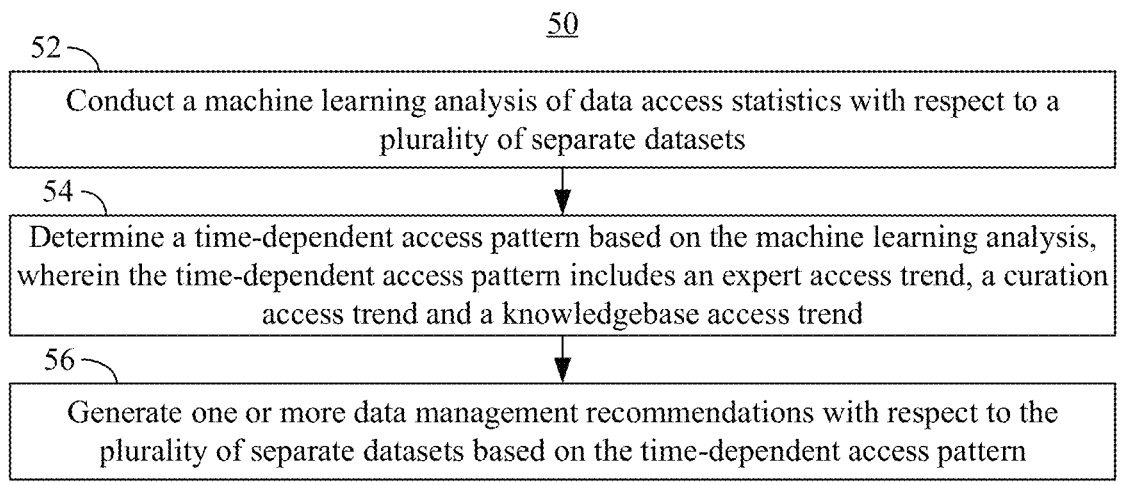
FIG. 2 is a flowchart of an example of a method of managing datasets according to an embodiment.

FIG. 2 shows a method 50 of managing datasets. The method 50 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 52 conducts an ML analysis of data access statistics with respect to a plurality of separate datasets. In an embodiment, the data access statistics include user identifiers, device identifiers, location identifiers, etc., or any combination thereof. The data access statistics may be obtained from a remote audit log or other appropriate source/data structure. In one example, the ML analysis includes applying the data access statistics to neural network (e.g., LSTM or other type of RNN) layers such as, for example, connection layers, access pattern layers, relationship layers, etc., or any combination thereof. Thus, the connection layer(s) may classify the data access statistics as containing one or more types of input/output (I/O) connections. In an embodiment, the access pattern layer(s) further classify the connections and/or data access statistics as containing one or more types of access patterns (e.g., periodic, increasing, decreasing). In an embodiment, the relationship layer(s) further classify the access patterns, connections and/or data access statistics as containing certain types of relationships between events (e.g., based on a derived behavior model). The output of the layers may include vector-based classifications with corresponding confidence levels.

Illustrated block 54 provides for determining a time-dependent access pattern based on the ML analysis, wherein the time-dependent access pattern includes an expert access trend, a curation access trend and a knowledgebase access trend. In an embodiment, the expert access trend specifies one or more users who are inferred to be experts in at least a portion of the datasets. The inference of expert status may be in response to detected read/write accesses to the datasets as well as changes to the underlying data structure (e.g., addition of columns and/or rows) by the user in question. Additionally, the curation trend may specify one or more users who are inferred to be curators of at least a portion of the plurality of datasets. In one example, the inference of curator status is in response to detected changes to the underlying data structure by the user in question without read/write accesses to the datasets. In an embodiment, the knowledgebase access trend specifies one or more users who are inferred to be learners of at least a portion of the datasets. The inference of learner status may be in response to detected read accesses from the datasets by the user in question without writes to the datasets. Other access trends may be automatically incorporated into the time-dependent access pattern.

Illustrated block 56 generates one or more data management recommendations with respect to the plurality of separate datasets based on the time-dependent access pattern. In an embodiment, the data management recommendation(s) include usage recommendations (e.g., access before or after a certain time window), contact recommendations (e.g., advise a learner to consult with an expert, an expert to advise a learner, a curator to consult with an expert, and so forth), infrastructure recommendations (e.g., re-provision data and/or compute resources), etc., or any combination thereof. In an embodiment, the data management recommendation(s) are generated further based on user prompt responses.

The method 50 therefore enhances performance by enabling time-dependent access patterns to be automatically determined and projected to future moments in time. Moreover, distinguishing between expert access trends, curation access trends, knowledgebase access trends, etc., enables the data management recommendations to be more closely tailored to the specific users involved. Indeed, optimal recommendations may be made even when the organization/enterprise has not pre-selected the experts, curators and/or learners or the pre-selections are incorrect.

Figure 3:
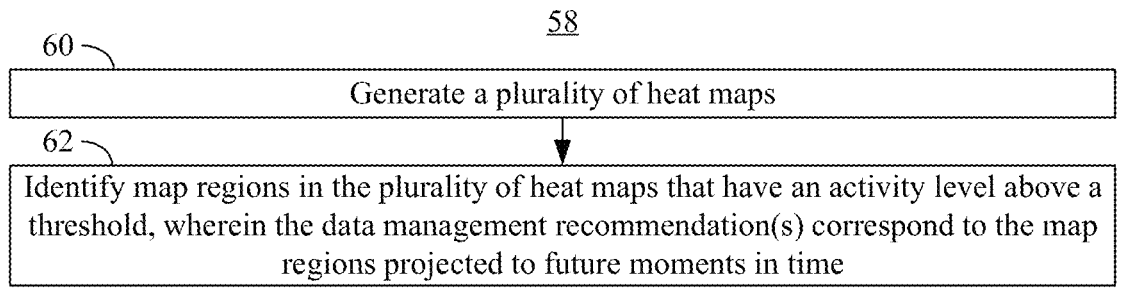
FIG. 3 is a flowchart of an example of a method of determining a time-dependent access pattern according to an embodiment.

FIG. 3 shows a method 58 of determining a time-dependent access pattern. In an embodiment, the method 58 is readily substituted for block 54 (FIG. 2), already discussed. Thus, the method 58 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, CPU, microcontroller, etc.).

Illustrated processing block 60 generates a plurality of heat maps such as, for example, the heat maps 34 (FIG. 1), already discussed. In the illustrated example, block 62 identifies map regions in the plurality of heat maps that have an activity level above a threshold, wherein the data management recommendation(s) correspond to the map regions projected to future moments in time.

Figure 4:
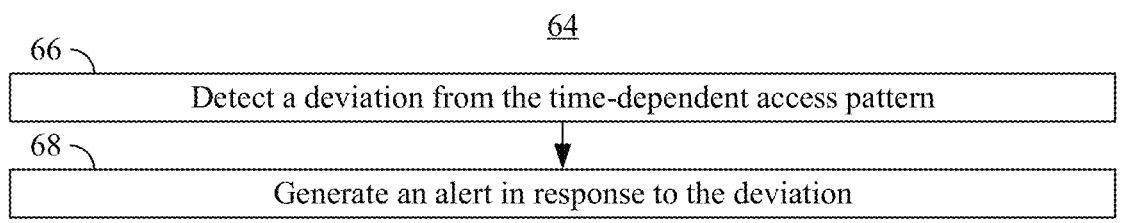
FIG. 4 is a flowchart of an example of a method of handling deviations from a time-dependent access pattern according to an embodiment.

FIG. 4 shows a method 64 of handling deviations from a time-dependent access pattern. The method 64 may generally be implemented in fixed-functionality hardware, configurable logic, logic instructions, etc., or any combination thereof. For example, the logic instructions might include assembler instructions, ISA instructions, machine instructions, machine dependent instructions, microcode, state-setting data, configuration data for integrated circuitry, state information that personalizes electronic circuitry and/or other structural components that are native to hardware (e.g., host processor, CPU, microcontroller, etc.).

Illustrated processing block 66 provides for detecting a deviation from the time-dependent access pattern. In an embodiment, block 66 includes comparing a current access pattern to the time-dependent access pattern in terms of user, device, location, dataset, etc., or any combination thereof. Block 68 generates an alert in response to the deviation. In an embodiment, block 68 includes outputting the alert via local user interface (UI) device and/or sending the alert to a remote platform via network interface circuitry. The illustrated method 64 therefore further enhances performance by enabling real-time detection of security breaches.

Figure 5:
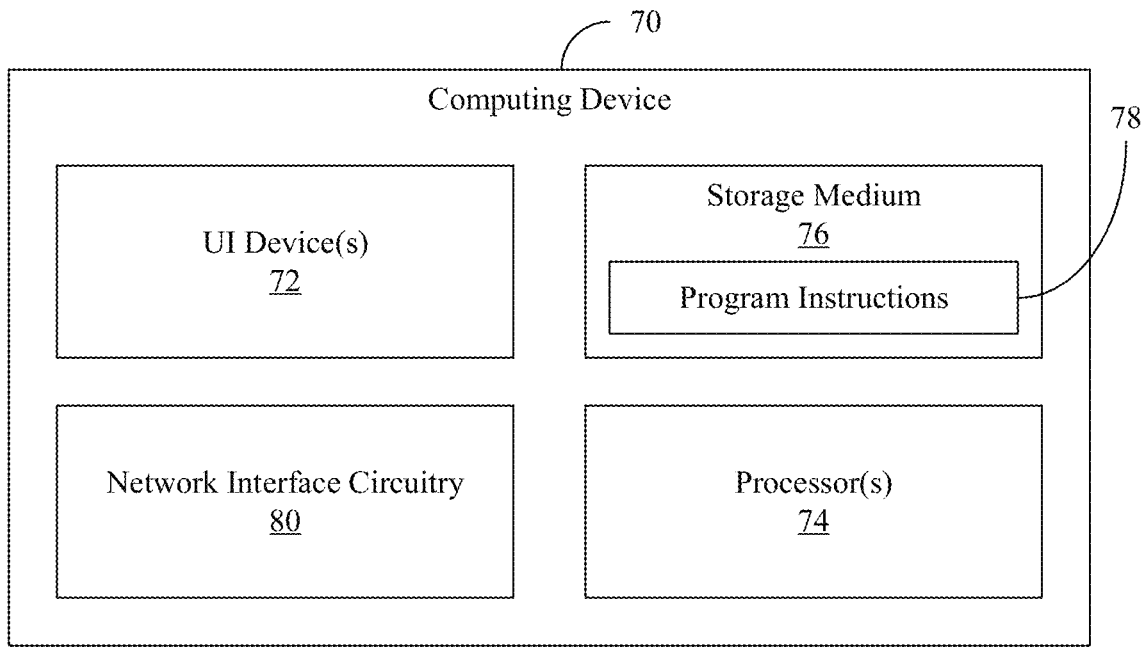
FIG. 5 is a block diagram of an example of a performance-enhanced computing device according to an embodiment.

FIG. 5 shows a computing device 70 that may be used to manage datasets. The illustrated computing device 70, which may be centralized (e.g., client device, server) or distributed (e.g., data center, cloud computing infrastructure), includes one or more user interface (UI) devices 72 (e.g., keyboard, mouse, touch pad, touch screen, monitor, microphone, speaker). One or more processors 74 are coupled to the UI device(s) 72, network interface circuitry 80 that receives data access statistics (e.g., user identifiers/IDs, device IDs, location IDs, etc.), and a storage medium 76 (e.g., non-volatile memory, volatile memory, etc., or any combination thereof). In the illustrated example, the storage medium 76 includes program instructions 78 embodied therewith. The program instructions 78 are executable by the processors 74 to cause the computing device 70 to perform one or more aspects of the method 50 (FIG. 2), the method 58 (FIG. 3) and/or the method 64 (FIG. 4), already discussed.

Thus, execution of the program instructions 78 causes the computing device 70 to conduct a machine learning analysis of the data access statistics with respect to a plurality of separate datasets and determine a time-dependent access pattern based on the machine learning analysis. In an embodiment, the time-dependent access pattern includes an expert access trend, a curation access trend and a knowledgebase access trend. Execution of the illustrated program instructions 78 also causes the computing device 70 to generate one or more data management recommendations with respect to the separate datasets based on the time-dependent access pattern. In one example, the program instructions 78 are executable to cause the computing device 70 to apply the data access statistics to a plurality of layers such as, for example, a connection layer, an access pattern layer, a relationship layer, etc., or any combination thereof. The layers may be convolutional neural network (CNN) layers or other suitable layers depending on the circumstances. Moreover, the time-dependent access pattern may be represented by a plurality of heat maps.

Figure 6:
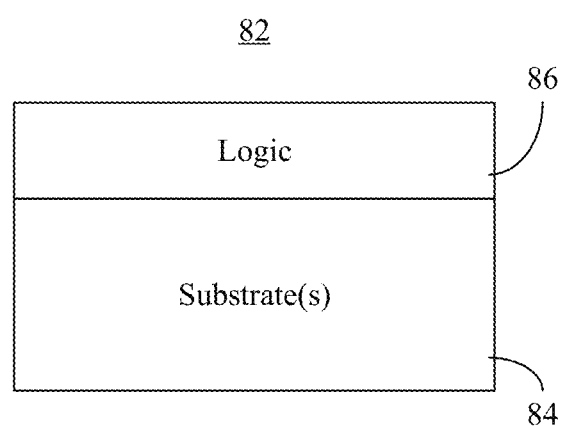
FIG. 6 is an illustration of an example of a semiconductor apparatus according to an embodiment.

Turning now to FIG. 6, a semiconductor package 82 (e.g., chip, die) that includes one or more substrates 84 (e.g., silicon, sapphire, gallium arsenide) and logic 86 (e.g., transistor array and other integrated circuit/IC components) coupled to the substrate(s) 84. The logic 86, which may be implemented at least partly in configurable logic and/or fixed-functionality hardware logic, may generally implement one or more aspects of the method 50 (FIG. 2), the method 58 (FIG. 3) and/or the method 64 (FIG. 4), already discussed.

Thus, the illustrated logic 86 conducts an ML analysis of data access statistics with respect to a plurality of separate datasets and determines a time-dependent access pattern based on the ML analysis, wherein the time-dependent access pattern includes an expert access trend, a curation access trend, and a knowledgebase access trend. In an embodiment, the logic 86 also generates one or more data management recommendations with respect to the plurality of separate datasets based on the time-dependent access pattern.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computing device comprising:
   network interface circuitry to receive data access statistics;
   a processor coupled to the network interface circuitry; and
   a computer readable storage medium coupled the processor, the computer readable storage medium having program instructions embodied therewith, the program instructions executable by the processor to cause the computing device to:
   conduct a machine learning analysis of the data access statistics with respect to a plurality of separate datasets;
   generate a plurality of heat maps based on the machine learning analysis, wherein the plurality of heat maps represents a time-dependent access pattern and includes an expert access trend, a curation access trend and a knowledgebase access trend, wherein the expert access trend specifies one or more users who are inferred to be experts in at least a portion of the plurality of separate datasets, wherein the curation trend specifies one or more users who are inferred to be curators of at least a portion of the plurality of separate datasets, and wherein the knowledgebase access trend specifies one or more users who are inferred to be learners of at least a portion of the plurality of separate datasets;
   identify map regions in the plurality of heat maps that have an activity level above a threshold, and
   generate one or more data management recommendations with respect to the plurality of separate datasets based on the time-dependent access pattern, wherein the one or more data management recommendations correspond to the map regions projected to future moments in time.

2. The computing device of claim 1, wherein the program instructions are executable to cause the computing device to apply the data access statistics to a plurality of layers selected from the group consisting of a connection layer, an access pattern layer and a relationship layer.

3. The computing device of claim 1, wherein the one or more data management recommendations are selected from the group consisting of usage recommendations, contact recommendations and infrastructure recommendations.

4. The computing device of claim 1, wherein at least one of the one or more data management recommendations are generated further based on a user prompt response.

5. The computing device of claim 1, wherein the program instructions are further executable to cause the computing device to:
   detect a deviation from the time-dependent access pattern; and
   generate an alert in response to the deviation.

6. The computing device of claim 1, wherein the data access statistics include identifiers selected from the group comprising user identifiers, device identifiers and location identifiers.

7. A method comprising:
   conducting a machine learning analysis of data access statistics with respect to a plurality of separate datasets;
   generating a plurality of heat maps based on the machine learning analysis, wherein the plurality of heat maps represents a time-dependent access pattern and includes an expert access trend, a curation access trend and a knowledgebase access trend, wherein the expert access trend specifies one or more users who are inferred to be experts in at least a portion of the plurality of separate datasets, wherein the curation trend specifies one or more users who are inferred to be curators of at least a portion of the plurality of separate datasets, and wherein the knowledgebase access trend specifies one or more users who are inferred to be learners of at least a portion of the plurality of separate datasets;
   identifying map regions in the plurality of heat maps that have an activity level above a threshold,
   generating one or more data management recommendations with respect to the plurality of separate datasets based on the time-dependent access pattern and a user prompt response, wherein the one or more data management recommendations correspond to the map regions projected to future moments in time;
   detecting a deviation from the time-dependent access pattern; and
   generating an alert in response to the deviation.

8. The method of claim 7, wherein conducting the machine learning analysis includes applying the data access statistics to a plurality of layers selected from the group consisting of a connection layer, an access pattern layer and a relationship layer.

9. The method of claim 7, wherein the one or more data management recommendations are selected from the group consisting of usage recommendations, contact recommendations and infrastructure recommendations.

10. The method of claim 7, wherein the data access statistics include identifiers selected from the group comprising user identifiers, device identifiers and location identifiers.

11. A computer program product to manage datasets, the computer program product comprising a computer readable storage medium having program instructions embodied therewith, the program instructions executable by a computing device to cause the computing device to:

conduct a machine learning analysis of data access statistics with respect to a plurality of separate datasets;

determine a time-dependent access pattern based on the machine learning analysis, wherein the time-dependent access pattern includes an expert access trend, a curation access trend and a knowledgebase access trend; and generate one or more data management recommendations with respect to the plurality of separate datasets based on the time-dependent access pattern.

12. The computer program product of claim 11, wherein the program instructions are executable to cause the computing device to apply the data access statistics to a plurality of layers selected from the group consisting of a connection layer, an access pattern layer and a relationship layer.

13. The computer program product of claim 11, wherein the program instructions are executable to cause the computing device to:

generate a plurality of heat maps; and identify map regions in the plurality of heat maps that have an activity level above a threshold, wherein the one or more data management recommendations correspond to the map regions projected to future moments in time.

14. The computer program product of claim 11, wherein the expert access trend specifies one or more users who are inferred to be experts in at least a portion of the plurality of separate datasets.

15. The computer program product of claim 11, wherein the curation trend specifies one or more users who are inferred to be curators of at least a portion of the plurality of separate datasets.

16. The computer program product of claim 11, wherein the knowledgebase access trend specifies one or more users who are inferred to be learners of at least a portion of the plurality of separate datasets.

17. The computer program product of claim 11, wherein the one or more data management recommendations are selected from the group consisting of usage recommendations, contact recommendations and infrastructure recommendations.

18. The computer program product of claim 11, wherein at least one of the one or more data management recommendations are generated further based on a user prompt response.

19. The computer program product of claim 11, wherein the program instructions are further executable to cause the computing device to:

detect a deviation from the time-dependent access pattern; and generate an alert in response to the deviation.

20. The computer program product of claim 11, wherein the data access statistics include identifiers selected from the group comprising user identifiers, device identifiers and location identifiers.

* * * * *